(12) United States Patent
Yamada et al.

(10) Patent No.: US 7,256,147 B2
(45) Date of Patent: Aug. 14, 2007

(54) POROUS BODY AND MANUFACTURING METHOD THEREFOR

(75) Inventors: Yuka Yamada, Nara (JP); Masa-aki Suzuki, Osaka (JP); Nobuyasu Suzuki, Nara (JP); Yasunori Morinaga, Suita (JP); Hidehiro Sasaki, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 135 days.

(21) Appl. No.: 11/133,282

(22) Filed: May 20, 2005

(65) Prior Publication Data

US 2005/0215068 A1 Sep. 29, 2005

Related U.S. Application Data

(63) Continuation of application No. PCT/JP2004/008819, filed on Jun. 17, 2004.

(30) Foreign Application Priority Data

Jun. 20, 2003 (JP) ............................. 2003-176459

(51) Int. Cl.
*H01L 21/26* (2006.01)
(52) U.S. Cl. ...................... 438/795; 438/478; 438/482; 438/483; 438/500; 438/502; 438/795; 438/796; 257/E21.011; 257/E21.013
(58) Field of Classification Search ..................... None
See application file for complete search history.

(56) References Cited

U.S. PATENT DOCUMENTS

| 6,843,919 | B2 * | 1/2005 | Klabunde et al. ........... 210/660 |
| 2002/0132159 | A1 | 9/2002 | Ohya et al. |
| 2004/0202602 | A1 * | 10/2004 | Masa-aki et al. ....... 423/445 R |

FOREIGN PATENT DOCUMENTS

| JP | 05-105513 | 4/1993 |
| JP | 05-105513 A | 4/1993 |
| JP | 2000-070709 | 3/2000 |
| JP | 2000-070709 A | 3/2000 |
| JP | 2002-170574 | 6/2002 |
| JP | 2002-170574 A | 7/2002 |

* cited by examiner

*Primary Examiner*—Michael Lebentritt
*Assistant Examiner*—Kyoung Lee
(74) *Attorney, Agent, or Firm*—McDermott Will & Emery LLP

(57) ABSTRACT

It is an object of the present invention to provide a porous body containing an oxide semiconductor in which more efficient photocatalytic reactions and photoelectrode reactions occur. The present invention relates to a porous body having a network structure skeleton wherein 1) the aforementioned skeleton is composed of an inner part and a surface part, 2) the aforementioned inner part is substantially made of carbon material, and 3) all or part of the aforementioned surface part is an oxide semiconductor, and to a manufacturing method therefor.

18 Claims, 8 Drawing Sheets

POROUS BODY AND MANUFACTURING METHOD THEREFOR

REFERENCE TO RELATED APPLICATION

This Application is a continuation of International Application No. PCT/JP2004/008819, whose international filing date is Jun. 17, 2004, which in turn claims the benefit of Japanese Application No. 2003-176459, filed Jun. 20, 2003, the disclosures of which Applications are incorporated by reference herein. The benefit of the filing and priority dates of the International and Japanese Applications is respectfully requested.

TECHNICAL FIELD

The present invention relates to the porous body of an oxide semiconductor for use in photocatalysts, electrodes of solar cells and the like, and to a manufacturing method therefor. In particular, it relates to a photocatalyst or photoelectrode capable of efficiently generating an oxidation-reduction reaction when exposed to light.

BACKGROUND ART

When a semiconductor is exposed to light, electrons are produced with a strong reduction action and positive holes with a strong oxidation action, breaking down electrons contacting the semiconductor by means of an oxidation-reduction action. This property of semiconductors is called photocatalysis, and since the discovery of the photolysis of water by semiconductor photoelectrodes (the so-called Honda-Fujishima effect), it has been widely studied as a useful technique of converting light to chemical energy. Efforts have also been made to apply this principle for example to 1) oxidation of organic compounds, 2) hydrogenation of unsaturated compounds and other forms of organic synthesis, 3) removal and degradation of harmful chemicals in waste water and exhaust gas, 4) sterilization, 5) degradation of surface dirt and the like.

Such semiconductors (photocatalysts) which have been already discovered include not only titanium dioxide (titania) but also vanadium pentoxide, zinc oxide, tungsten oxide, copper oxide, iron oxide, strontium titanate, barium titanate, sodium titanate, cadmium sulfate, zirconium dioxide, iron oxide and the like. These semiconductors are also known to be effective as photocatalysts when supporting a metal such as platinum, palladium, rhodium, ruthenium or the like as a co-catalyst.

Semiconductor powder has been frequently used in conventional photocatalyst studies, but in order for photocatalysts to be practical they need to be made into films. To this end, they have been fixed in resin or glass, or the semiconductor itself has been used in the form of a thin film. The problem is that there is not enough of the catalyst itself, and its effects are also not adequate. In order to increase the amount of catalyst it is sufficient to increase the area of the catalyst layer, but this is often difficult because of design limitations.

With semiconductors such as these it is possible to obtain electrode output by exposing an n-type semiconductor to light. Consequently, they are used in the electrodes and the like of wet photoelectric cells using the photosensitized degradation effect. In particular there has been much development of dye-sensitized solar cells in recent years. The principal structure of the semiconductor electrode, which is a working electrode, is composed of a dye sensitizer adsorbed by a porous semiconductor layer. Materials which are used for such semiconductors include titanium dioxide (titania), tin oxide, zinc oxide, niobium oxide and the like. Ruthenium complexes and the like are known as sensitizing dyes. These dye-sensitized solar cells promise to be simpler in structure and cheaper than conventional silicon solar cells, but the greatest obstacle to practical application is improving exchange efficiency.

Therefore, methods are being studied of increasing the specific surface area of the semiconductor with low density in order to obtain greater optical activity in a small volume in photocatalysts and photoelectrodes. In other words, methods are being studied of making semiconductors more porous.

For example, a method has been presented of obtaining a porous titanium oxide thin-film photocatalyst with pores of a uniform size on the surface by first coating a substrate with titania sol and then heating and baking it (for example, Japanese Patent Publication No. 2636158).

Alternatively, a method has been presented of supporting or coating a photocatalyst on a porous silica body having pores 2 to 50 nm in diameter (for example, Japanese Unexamined Patent Publication No. H10-151355).

For example, an oxide semiconductor electrode has been developed (Japanese Unexamined Patent Publication No. 2001-76772) having a conductive substrate and a porous oxide semiconductor layer comprising hollow particles made of metal oxide formed on the aforementioned conductive substrate (Japanese Unexamined Patent Publication No. 2001-76772).

List of References Cited in this Application

Japanese Unexamined Patent Publication No. 2001-076772
Japanese Unexamined Patent Publication No. 2000-319018
WO 98/35267
Japanese Unexamined Patent Publication No. 2003-301283
Japanese Unexamined Patent publication No. H3-093634
Japanese Unexamined Patent Publication No. H5-023637
Japanese Unexamined Patent Publication No. S63-280748

DISCLOSURE OF THE INVENTION

However, a careful investigation of methods of making a porous body by heating and baking an organic gel as in Japanese Patent Publication No. 2636158 has revealed the following problems.

(1) In the step of baking an organic gel of precursor polymer of an organic semiconductor, the porous body of the precursor shrinks as it is baked, so that the resulting porous body of oxide semiconductor tends to be denser than the precursor, with a smaller specific surface area.

(2) Because an organic gel with a network structure skeleton is baked, the density and specific surface area of the oxide semiconductor porous body formed by baking of this organic gel are dependent on the structure of the organic gel, and are difficult to control once the organic gel has been obtained.

Moreover, when silica is used as the carrier as in Japanese Unexamined Patent Publication No. H10-151355 there is the problem of poor electrical conductivity because silica is an insulator. In photoelectrode applications in particular there is a need to improve the conductivity of the porous body and the electronic network among the semiconductor particles in order to improve efficiency.

In addition, in the oxide semiconductor electrode of Japanese Unexamined Patent Publication No. 2001-76772 because the fine particles are linked to form hollow structures the electronic networks among the fine particles are weak, which may reduce electrical conductivity.

Consequently, it is a principal object of the present invention to provide a porous body comprising an oxide semiconductor wherein more efficient photocatalytic reactions and photoelectrode reactions occur.

It is another object of the present invention to provide a means of efficiently manufacturing a porous body comprising an oxide semiconductor.

The present invention relates to the following porous body and method of manufacture.

1. A porous body having a network structure skeleton, wherein 1) the skeleton is composed of an inner part and a surface part, 2) the inner part is substantially made of carbon material, and 3) all or part of the surface part is an oxide semiconductor.

2. The porous body according to 1 above, wherein the oxide semiconductor is at least one kind of metal oxide.

3. The porous body according to 1 above, wherein the specific surface area is 100 $m^2/g$ or more.

4. The porous body according to 1 above, wherein a co-catalyst is supported on the skeleton.

5. The porous body according to 4 above, wherein the oxide semiconductor has a catalytic function and the co-catalyst contacts the oxide semiconductor.

6. The porous body according to 1 above, wherein a dye is supported on said skeleton.

7. A method for manufacturing an oxide semiconductor/carbon porous body which has a network structure skeleton, 1) the skeleton being composed of an inner part and a surface part, 2) the inner part being substantially made of carbon material, and 3) all or part of the surface part being an oxide semiconductor, the manufacturing method comprising:

(1) Step 1 of obtaining a composite wet gel by coating the skeleton in a carbon precursor-containing wet gel having a network structure skeleton with an oxide semiconductor precursor;

(2) Step 2 of obtaining a composite dry gel by drying the composite wet gel; and (3) Step 3 of obtaining an oxide semiconductor/carbon composite porous body by heat-treating the composite dry gel.

8. The manufacturing method according to 7 above, wherein the heat treatment is performed in an atmosphere of oxygen concentration 0 to 10% by volume.

9. The manufacturing method according to 7 above, wherein the heat treatment is performed in an inert gas atmosphere.

10. The manufacturing method according to 7 above, further comprising a step of imparting a co-catalyst and/or dye.

11. The manufacturing method according to 7 above, wherein the carbon precursor comprises an organic polymer.

12. The manufacturing method according to 11 above, wherein the organic polymer is at least one of polyacrylonitrile, polyfurfuryl alcohol, polyimide, polyamide, polyamidimide, polyurethane, polyurea, polyphenol, polyaniline and polyparaphenylene.

13. A method for manufacturing a porous body which has a network structure skeleton, 1) the skeleton being composed of an inner part and a surface part, 2) the inner part being substantially made of carbon material, and 3) all or part of the surface part being an oxide semiconductor, the manufacturing method comprising:

(1) Step 1 of obtaining a dry gel having a network structure skeleton by drying a wet gel containing a carbon precursor and having a network structure skeleton;

(2) Step 2 of obtaining a composite precursor by coating the skeleton in the dry gel with an oxide semiconductor; and (3) Step 3 of obtaining an oxide semiconductor/carbon composite porous body by heat-treating the composite precursor.

14. The manufacturing method according to 13 above, wherein the heat treatment is performed in an atmosphere of oxygen concentration 0 to 10% by volume.

15. The manufacturing method according to 13 above, wherein the heat treatment is performed in an inert gas atmosphere.

16. The manufacturing method according to 13 above, further comprising a step of imparting a co-catalyst and/or dye.

17. The manufacturing method according to 13 above, wherein the carbon precursor comprises an organic polymer.

18. The manufacturing method according to 17 above, wherein the organic polymer is at least one of polyacrylonitrile, polyfurfuryl alcohol, polyimide, polyamide, polyamidimide, polyurethane, polyurea, polyphenol, polyaniline and polyparaphenylene.

19. A method for manufacturing a porous body which has a network structure skeleton, 1) the skeleton being composed of an inner part and a surface part, 2) the inner part being substantially made of carbon material, and 3) all or part of the surface part being an oxide semiconductor, the manufacturing method comprising:

(1) Step 1 of obtaining a dry gel having a network structure skeleton by drying a wet gel containing a carbon precursor and having a network structure skeleton;

(2) Step 2 of obtaining a carbon porous body by carbonizing the dry gel, and (3) Step 3 of obtaining an oxide semiconductor/carbon composite porous body by coating the skeleton in the carbon porous body with an oxide semiconductor.

20. The manufacturing method according to 19 above, wherein the carbonization is performed in an atmosphere of oxygen concentration 0 to 10% by volume.

21. The manufacturing method according to 19 above, wherein the carbonization is performed in an inert gas atmosphere.

22. The manufacturing method according to 19 above, further comprising a step of imparting a co-catalyst and/or dye.

23. The manufacturing method according to 19 above, wherein the carbon precursor comprises an organic polymer.

24. The manufacturing method according to 23 above, wherein the organic polymer is at least one of polyacrylonitrile, polyfurfuryl alcohol, polyimide, polyamide, polyamidimide, polyurethane, polyurea, polyphenol, polyaniline and polyparaphenylene.

25. A solar cell comprising the porous body of 1 above as an electrode material.

26. A method for manufacturing an oxide semiconductor porous body having a network structure skeleton, the method comprising:

a pretreatment step of obtaining an oxide semiconductor precursor composite wet gel by coating the skeleton in a template material-containing wet gel having a network structure skeleton with an oxide semiconductor precursor;

a drying step of obtaining an oxide semiconductor precursor composite dry gel by drying the composite wet gel and a step of obtaining an oxide semiconductor porous body by heat-treating the dry gel in a gas atmosphere containing oxygen to remove the template material having a network structure skeleton.

27. A method for manufacturing an oxide semiconductor porous body having a network structure skeleton, the method comprising:

a step of obtaining a templete material containing dry gel having a network structure skeleton by drying a template material containing wet gel having a network structure skeleton;

a step of obtaining an oxide semiconductor composite precursor by coating the skeleton in the dry gel with an oxide semiconductor material; and a step of obtaining an oxide semiconductor porous body by heat-treating the composite precursor in a gas atmosphere containing oxygen to remove the template material having a network structure skeleton.

28. A method for manufacturing an oxide semiconductor porous body having a network structure skeleton, the method comprising:

a step of obtaining a dry gel of a template material having a network structure skeleton by drying a template material containing wet gel having a network structure skeleton;

a step of obtaining a template porous body by solidifying the dry gel;

a step of obtaining an oxide semiconductor/template material composite porous body by coating the skeleton in the template porous body with an oxide semiconductor material; and a step of obtaining an oxide semiconductor porous body by removing the template material having a network structure skeleton from the composite porous body.

29. A method for manufacturing an oxide semiconductor porous body having a network structure skeleton, the method comprising:

a pretreatment step of obtaining an oxide semiconductor precursor composite wet gel by coating the skeleton in a template material containing wet gel having a network structure skeleton with an oxide semiconductor precursor;

a template material removal step of obtaining an oxide semiconductor precursor wet gel by removing the template material from the composite wet gel;

a drying step of obtaining an oxide semiconductor precursor dry gel by drying the wet gel; and a step of obtaining an oxide semiconductor porous body by heat-treating the dry gel.

30. A method for manufacturing a porous body according to any of 26 through 29 above, further comprising a step of supporting a co-catalyst.

31. A method for manufacturing a porous body according to any of 26 through 29 above, further comprising a step of supporting a dye.

32. A method for manufacturing a porous body according to any of 26 through 29 above, wherein the template material is carbon.

LIST OF ELEMENTS

Figure 1:
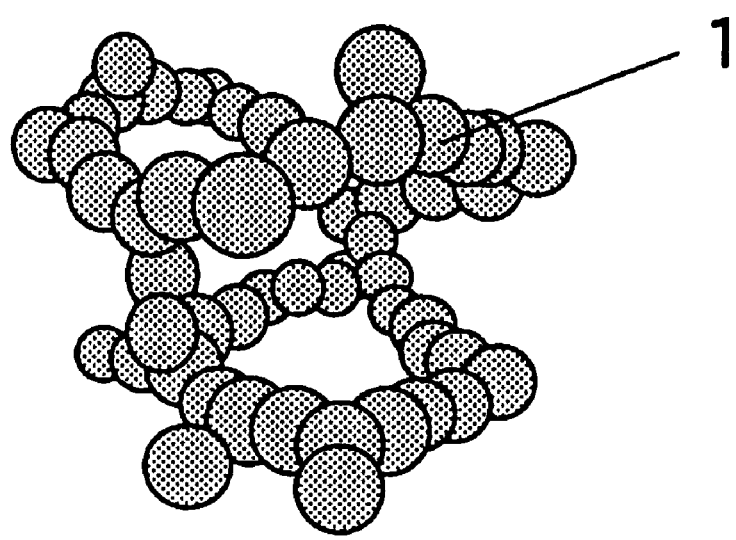
FIG. 1 is a typical drawing for explaining the network structure skeleton in the porous body of the present invention.

1 Network structure skeleton
2 Skeleton
3 Carbon material
4 Oxide semiconductor
6 Oxide semiconductor
7 Hollow part
8 Network structure skeleton of porous body
9 Supported co-catalyst or dye

BEST MODE FOR CARRYING OUT THE INVENTION

Embodiments of the present invention are explained below. First, the structure of the porous body of the present invention is explained using examples.

1. Porous body

The porous body of the present invention is a porous body having a network structure skeleton, wherein 1) the skeleton is composed of an inner part and a surface part, 2) the inner part is substantially made of carbon material, and 3) all or part of the surface part is an oxide semiconductor.

The network structure skeleton of the porous body of the present invention may be any having a three-dimensional network structure. The network structure skeleton is composed of an inner part and a surface part.

The inner part is substantially made of carbon material. The carbon material of the inner part may be densely packed or holes may be formed in a part thereof. The proportion of pores can be set appropriately depending on the desired characteristics of the porous body and the like.

There are no particular limits on the carbon material as long as it is carbon itself or a material having carbon as its main component. The carbon material obtained by the manufacturing method described below is desirable. That is, 1) a carbon material produced by heat treatment of a raw carbon material and/or 2) a carbon material produced by carbonization of an organic polymer which is a carbon precursor can be used. The advantage of these is that their carbon structures, characteristics and the like can be controlled at will by means of the production conditions, carbonization conditions and the like.

The carbon material can be either crystalline or amorphous, and can be set appropriately depending on the intended use of the porous body, the method of use and the like.

All or part of the surface part is composed of an oxide semiconductor. In particular, a material which causes a photocatalytic reaction can be used favorably for the oxide semiconductor used in the present invention. Examples include at least one oxide (metal oxide) such as titanium dioxide (titania), vanadium pentoxide, zinc oxide, tungsten oxide, copper oxide, strontium titanate, barium titanate, sodium titanate, zirconium dioxide, $\alpha$—$Fe_2O_3$, $K_4Nb_6O_{17}$, $Rb_4Nb_6O_{17}$, $K_2Rb_2Nb_6O_{17}$, $Pb_{1-x}K_{2x}NbO_6$ (where $0<x<1$) and the like.

Other components can be included in the porous body of the present invention as necessary. For example, a co-catalyst or promotor may be included. Co-catalysts which can be used include for example platinum, palladium, ruthenium, gold, copper, tin, zinc and other metals; platinum-palladium, platinum-ruthenium, platinum-iron-and other alloys; and nickel oxides, manganese oxides, rhodium oxides and other oxides. These can be selected appropriately depending on the intended use of the porous body, the desired reactions and the like. From the standpoint of photocatalytic activity, the supported amount of the co-catalyst can be selected in the range of normally 0.1 to 20% by weight based on the combined weight of the oxide semiconductor and the co-catalyst.

Dyes or colorants can also be included as necessary. In particularly, dyes which are known as sensitizing dyes can be used by preference. More specifically, it is desirable to use a ruthenium complex or the like. The supported amount of the dye can be selected appropriately depending on the type of dye used and the like.

The thickness of the surface part is not limited, and can be set appropriately depending on the intended use of the porous body, the purpose of use and the like. Moreover, the thickness can be controlled by altering the conditions in the manufacturing methods described below.

The ratio of inner part to surface part can be determined appropriately depending on the type of oxide semiconductor, the intended use of the porous body and the like.

The bulk density, BET specific surface area and mean pore size of the porous body of the present invention can be set appropriately depending on the type of oxide semiconductor, the intended use of the porous body, the method of use and the like. The bulk density can be selected appropriately from the range of normally no less than 10 $kg/m^3$ and no more than 800 $kg/m^3$ or particularly no less than 50 $kg/m^3$ and no more than 400 $kg/m^3$. The specific surface area can be set appropriately from the range of normally no less than 50 $m^2/g$ and no more than 1500 $m^2/g$ or particularly no less than 100 $m^2/g$ and no more than 1000 $m^2/g$ or more particularly no less than 200 $m^2/g$ and no more than 1000 $m^2/g$. The specific surface area is a value measured by the Brunauer-Emmett-Teller method (abbreviated hereunder as "BET method"), a nitrogen adsorption method. The mean pore size of the porous body of the present invention can be determined appropriately from the range of normally no less than 1 nm and no more than 1000 nm or particularly no less than 5 nm and no more than 50 nm.

Moreover, the shape and size of the porous body of the present invention are not limited and can be determined appropriately depending on the intended use of the porous body, the purpose of use and the like.

Preferred modes of the porous body of the present invention are explained below using figures.

(1) EMBODIMENT 1

Figure 2:
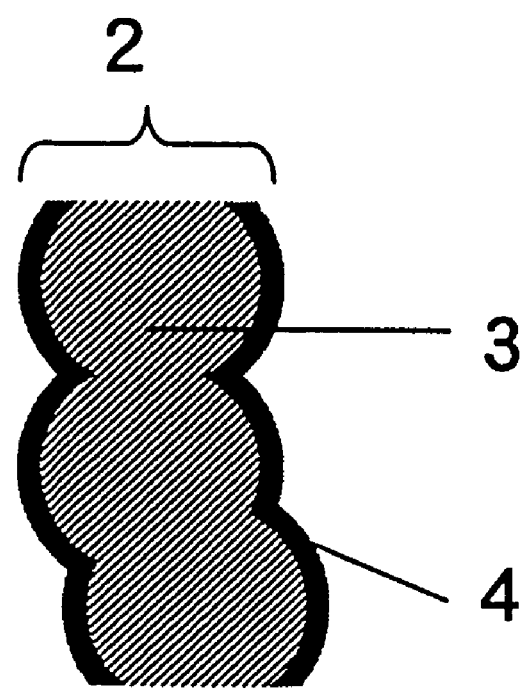
FIG. 2 is a cross-section showing the network structure skeleton in a oxide semiconductor/carbon composite porous body of the present invention.

The first configuration of a porous body according to the present invention is an oxide semiconductor/carbon composite porous body having network structure skeleton 1 as shown in FIG. 1. As shown in FIG. 2, this network structure skeleton 1 has the network structure consisting of dry gel of carbon material 3 as the core of the skeleton 2, and is coated with oxide semiconductor 4.

In the configuration of network structure skeleton 1, a skeleton such as that shown in FIG. 1 forms a three-dimensional mesh network. This structure can be formed for example by means of a process wherein a dry gel is obtained via a wet gel. Using this process, the skeleton forms a network structure by aggregation of fine particles and can be shown by a model as in FIG. 1. Actual observation of the aforementioned skeleton in an electron microscope image confirms that it has a porous structure composed of an aggregation of fine particles with gaps between the particles. In general, in a structure obtained by the aforementioned process pores are constituted from gaps formed by skeletons created from fine particles having a particle size of 100 nm or less. These pores are tiny, about 1 μm or less in size. A porosity of 50% or more can be achieved in this way, thus providing a porous body with a high specific surface area. In particular, in a network structure skeleton formed via a gel as in the present invention the particle size is small, between 1 nm and 50 nm, while the resulting pore size is tiny, 100 nm or less. In this way a porous body can be obtained with a porosity of 80% or more and a high specific surface area of 100 $m^2/g$ or more.

Consequently, in the oxide semiconductor/carbon composite porous body of the present invention, because the network structure skeleton of a dry gel of carbon material 3 is coated with oxide semiconductor 4, a porous body can be constituted with a high specific surface area. This allows application to highly active photocatalysts. Moreover, because the core of network structure skeleton 1 is composed of a carbon material having conductivity, greater electrical efficiency can be achieved when it is used in solar cells and other electrode materials.

This can be achieved more reliably by the manufacturing method of the present invention. In the manufacturing method of the present invention having a step of forming a crystalline oxide semiconductor by heat treatment or the like of a precursor gel of oxide semiconductor, which is one method of manufacturing an oxide semiconductor/carbon composite porous body, because network structure skeleton 1 of the carbon material is heat-resistant, it serves as a support for the oxide semiconductor in the heat treatment process, thus allowing shrinkage of the porous body to be controlled during oxide semiconductor formation. As a result, low density and high specific surface area of the resulting oxide semiconductor/carbon composite porous body can be achieved.

(2) EMBODIMENT 2

Figure 3:
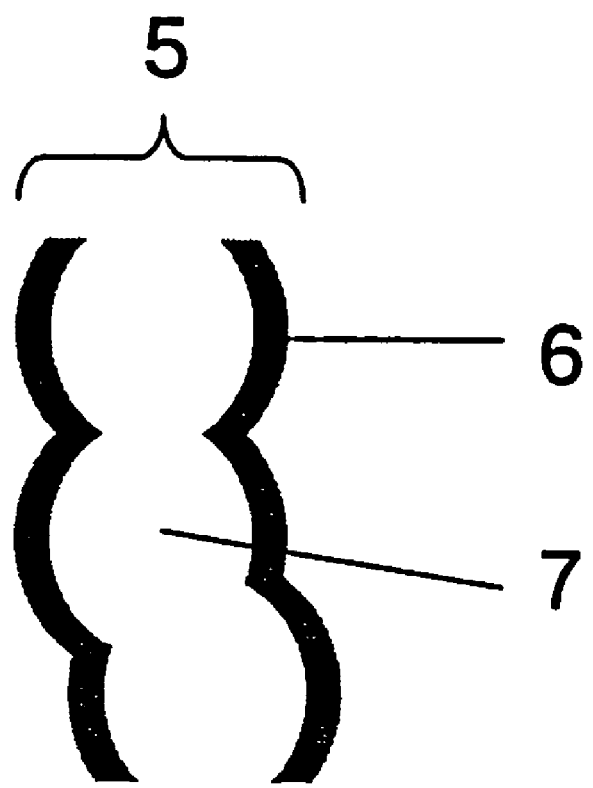
FIG. 3 is a cross-section showing the network structure skeleton in an oxide semiconductor porous body of the present invention.

The second mode of a porous body according to the present invention is an oxide semiconductor porous body having a network structure skeleton as shown in FIG. 1. As shown in FIG. 3 the surface part of this skeleton is composed of oxide semiconductor 6, while effectively all of the inside part is occupied by hollow part 7 (space).

In the aforementioned structure, in addition to the high specific surface area achieved by means of a network structure skeleton which is a dry gel structure, the inside of the skeleton is composed of hollow part 7. This porous body has an even greater specific surface area than the previous carbon composite porous body because it is hollow. This allows this porous body to be used as a more active photocatalyst, photoelectrode or the like.

Thus, although there is no carbon material in Embodiment 2, but as a porous body of the present invention it is particularly desirable that there be a residue of carbon material and that the inner part be partly hollow

(3) EMBODIMENT 3

Figure 4:
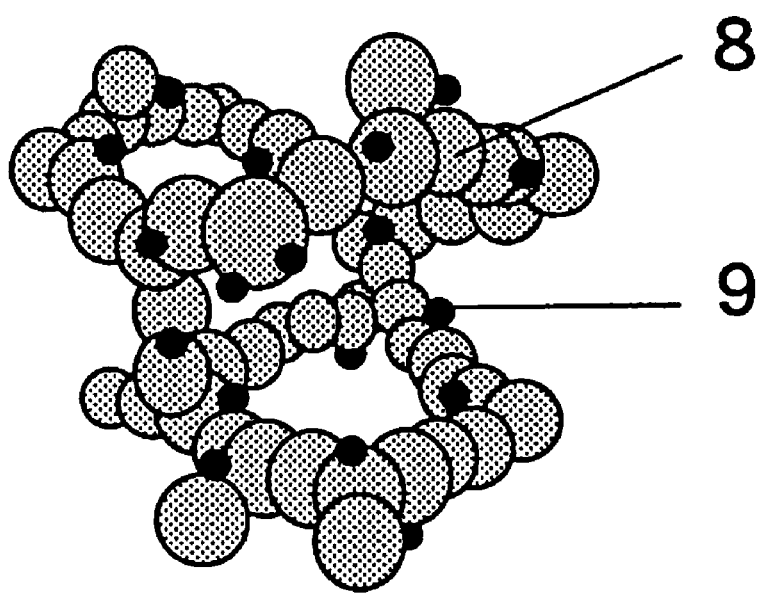
FIG. 4 is a typical drawing showing another example of the porous body of the present invention.

In the third configuration of a porous body according to the present invention, as shown in FIG. 4, co-catalyst 9 is supported on an oxide semiconductor having catalytic function in an oxide semiconductor/carbon composite porous body or oxide semiconductor porous body having network structure skeleton 1. This configuration allows a greater quantity of co-catalyst to be supported for purposes of using the porous body with a large specific surface area shown Embodiment 1 or 2 as a photocatalyst, and also offers such advantages as increasing the reaction activity points. This allows application to highly active photocatalysts and the like.

It is desirable here that the co-catalyst be in contact with the oxide semiconductor. In the oxide semiconductor/carbon composite porous body of Embodiment 1, the co-catalyst may be positioned either on the surface of the oxide semiconductor or between the carbon skeleton and the oxide semiconductor. In the oxide semiconductor porous body of Embodiment 2, the co-catalyst may be positioned either on the outer surface or inner surface of the skeleton of the oxide semiconductor. In particular, from the standpoint of increasing chances for contact with the object of reaction and thus increasing reactivity, it is desirable that the co-catalyst is present on the surface of the oxide semiconductor.

(4) EMBODIMENT 4

In the fourth configuration of a porous body according to the present invention, as shown in FIG. 4, dye 9 is supported on an oxide semiconductor in an oxide semiconductor/carbon composite porous body or oxide semiconductor porous body having network structure skeleton 1. This configuration allows a greater quantity of dyes or colorants to be supported for purposes of using the porous body with a large specific surface area shown Embodiment 1 or 2 as a photocatalyst, and also offers such advantages as increasing the reaction activity points. This allows application to electrode materials for dye-sensitized solar cells and the like.

It is desirable here that the dye be in contact with the oxide semiconductor. With the oxide semiconductor/carbon composite porous body of Embodiment 1, the dye may be positioned either on the surface of the oxide semiconductor or between the skeleton and the coated oxide semiconductor. With the oxide semiconductor porous body of Embodiment 2, the dye may be positioned either on the outer surface or inner surface of the skeleton of the oxide semiconductor.

2. Method for Manufacturing the Porous Body

There are no limits on the method for manufacturing the porous body of the present invention as long as a structure such as the aforementioned is achieved, but in particular Methods 1 through 4 below can be employed by preference.

(1) Method 1

Method 1 is a method for manufacturing an oxide semiconductor/carbon porous body which has a network structure skeleton, 1) the skeleton being composed of an inner part and a surface part, 2) the inner part being substantially made of carbon material, and 3) all or part of the surface part being an oxide semiconductor, the manufacturing method comprising:

(1) Step 1 of obtaining a composite wet gel by coating the skeleton in a carbon precursor-containing wet gel having a network structure skeleton with an oxide semiconductor precursor;

(2) Step 2 of obtaining a composite dry gel by drying the composite wet gel; and (3) Step 3 of obtaining an oxide semiconductor/carbon composite porous body by heat-treating the composite dry gel.

Step 1

In Step 1, a composite wet gel is obtained by coating the skeleton in a carbon precursor-containing wet gel having a network structure skeleton with an oxide semiconductor precursor.

An organic polymer material which is carbonized by heat treatment is desirable as the carbon precursor. For example, polyacrylonitrile, polfurfuryl alcohol, polyimide, polyamide, polyamidimide, polyurethane, polyurea, polyphenol, polyaniline, polyparaphenylene and the like can be used. One or two or more of these can be used.

A solution or dispersion of a separately synthesized precursor dissolved or dispersed in a solvent can be used for example as the wet gel containing a carbon precursor. A gelatinous reaction product obtained by reaction of these raw precursor materials in a solvent can also be used as is as the wet gel containing a carbon precursor.

In addition to water, examples of solvents include methanol, ethanol, propanol, butanol and other alcohols, ethylene glycol, propylene glycol and other glycols and the like. One or a mixture of two or more of these can be used. These can be selected appropriately according to the type of carbon precursor used and the like.

In this case, the concentration of the aforementioned solution or dispersion can be set appropriately according to the type of wet gel used, the type of solvent and the like.

When carbon precursor raw materials are used, known raw materials can be used therefor. For example, in the case of polyacrylonitrile, polyfurfuryl alcohol, polyaniline and the like, acrylonitrile, furfuryl alcohol, aniline and the like can be used as the raw material, respectively. When polyimide is synthesized by a condensation polymerization reaction which forms imide rings, an anhydrous tetracarboxylic acid compound and a diamine compound can normally be used. When polyamide is synthesized by a condensation polymerization reaction which forms amide bonds, a dicarboxylic acid compound, a dicarboxylic acid chloride compound and a diamine compound can normally be used. A diol compound such as polyol and a diisocyanate compound can be used for polyurethane. A diisocyanate compound can be used for polyurea. A phenol compound and an aldehyde compound or the like can be used for polyphenol. These raw materials are given to show the use of ordinary raw materials and the raw materials are not limited to these.

For these raw materials, those that contain aromatic components are desirable from the standpoint of ease of carbonization. Reaction of these raw materials together with a catalyst also allows efficient formation of the carbon precursor.

An example is explained below in which a polyphenol wet gel is used as the wet gel containing a carbon precursor. The method of synthesizing and gelling the polyphenol raw materials by a sol-gel reaction in a solvent is given as an example of a method of obtaining a wet gel. A catalyst can be used as necessary at this time. In this formation process, fine particles of polyphenol are formed as the raw materials react in the solvent, and these fine particles accumulate to form network structure skeleton 1, resulting in a wet gel. More particularly, a specific composition of the solvent and the raw materials which are the solid components is determined. Catalysts, viscosity adjusters and the like are added as necessary to the solution prepared with this composition under agitation, and the desired configuration is achieved by molding, application or the like. After a fixed time in this condition the solution gels, becoming a wet gel. Aging treatment can also be performed as necessary for purposes of curing, pore control or the like of the wet gel.

Examples of raw materials for polyphenol include phenol compounds such as phenol, cresol, resorcinol (1,3-benzenediol), catechol, phloroglucinol, novolak phenol resin, resol phenol resin and the like, as well as salicylic acid, hydroxybenzoic acid and other phenol carboxylic acids. Aldehyde compounds which are condensing agents include for example formaldehyde, acetaldehyde, furfural and the like as well as paraformaldehyde, hexamethylenetetramine and the like which produce formaldehyde when heated. A base catalyst and/or acid catalyst can be used as the condensation catalyst. Base catalysts mainly promote the addition reactions of methylol group and the like. Acid catalysts mainly promote the polyaddition condensation reactions of methylene bonds and the like. Base catalysts which can be used include sodium hydroxide, potassium hydroxide and other hydroxides of alkali metals; and sodium carbonate, potassium carbonate and other carbonates of alkali metals as well as amines, ammonia and other common catalysts used in phenol resin manufacture. Acid catalysts which can be used include for example sulfuric acid, hydrochloric acid, phosphoric acid, oxalic acid, acetic acid, trifluoroacetic acid and the like. The solvent may be any capable of dissolving the raw materials to form a polyphenol gel. In addition to water, examples include methanol, ethanol, propanol, butanol and other alcohols and ethylene glycol, propylene glycol and other glycols. One or a mixture of two or more of these may be used.

An example of the oxide semiconductor is that used in the porous body of the present invention. There are no particular limits on the precursor as long as it is a material which becomes the specified oxide semiconductor when heat treated. For example, a metal alkoxide, metal salt or the like can be selected as appropriate.

There are no particular limits on the method of coating with the oxide semiconductor precursor. Examples include a) a method of impregnating a wet gel containing a carbon precursor with a solution or dispersion of an oxide semiconductor precursor dissolved or dispersed in a solvent, or b) a method of first impregnating a wet gel containing a carbon precursor with an oxide semiconductor raw material, and then producing an oxide semiconductor precursor from the raw material within the aforementioned wet gel.

As method a) above, a solution or dispersion of an oxide semiconductor precursor dissolved or dispersed in a solvent is used and a wet gel containing a carbon precursor is immersed in that solution or dispersion. By this step the polymer adheres to and coats the skeleton of the network structure. For example, a titania ($TiO_2$) precursor as the oxide semiconductor precursor can be produced in the form of a sol of polymerized fine particles by hydrolysis using titanium methylphenoxide, titanium n-monoxide, titanium n-propoxide, titanium triisopropoxide tri-n-butylstannoxide or the like as the raw material. In this method, the wet gel holds the aforementioned solution or dispersion within itself, and these precursors adsorb or aggregate on the skeleton, producing a composite because they remain on the skeleton when it dries. Moreover, when a wet gel containing a solution of dissolved precursor is immersed in a poor solvent for that polymer, the precursor is precipitated to coat the skeleton. The method of coating a skeleton with an oxide semiconductor precursor is not limited by these, however.

As method b) above there is a method of immersing a wet gel of the carbon precursor in a solution of a dissolved raw material of the oxide semiconductor precursor and preparing the oxide semiconductor precursor within the gel. With this method, because the precursor is synthesized within network structure skeleton 1 it is possible to obtain a composite wet gel which is physically resistant to elusion of the oxide semiconductor precursor, making this a particular effective method of the present invention. Titanium methylphenoxide, titanium n-monoxide, titanium n-propoxide, titanium triisopropo-xide tri-n-butylstannoxide, titanium tetraisopropoxide or the like for example can be used as the titania precursor raw material. The oxide semiconductor precursor can be formed efficiently by reacting these raw materials in the presence of a catalyst.

The amount of oxide semiconductor precursor used can be such as to give the desired thickness of the coating layer.

Step 2

In step 2 a composite dry gel is produced by drying the aforementioned composite wet gel.

There are no particular limits on the drying method. For example, in addition to the normal drying methods of natural drying, heated-air drying and vacuum drying, supercritical drying, freeze drying and the like can be used. Normally gel strength is reduced if the surface area of the dry gel is increased while the amount of solid components in the wet gel is reduced in an effort to reduce density. If the gel is merely dried, moreover, it often shrinks due to stress during solvent evaporation. Supercritical drying or freeze drying can be used by preference as the drying method in order to obtain a dry gel with superior porosity from the wet gel. In this way it is possible to effectively avoid shrinkage of the gel during drying or in other words densification. Even in normal methods of drying by solvent evaporation, it is possible to reduce shrinkage of the gel during drying by using a high-boiling solvent to slow down the evaporation speed or by controlling the evaporation temperature. Shrinkage of the gel during drying can also be reduced by giving the surface of the solid components of the wet gel a water-repellent treatment or the like to control surface tension.

In supercritical drying or freeze drying, drying can be accomplished without any stress to the gel skeleton from surface tension by changing the phase state of the solvent from a liquid state in order to eliminate the gas-liquid boundary. It is thus possible to prevent shrinkage of the gel during drying and to obtain a porous body of dry gel with low density. In the present invention it is particularly desirable to use supercritical drying.

The solvent used in supercritical drying may be a solvent retained by the wet gel. It is also desirable as necessary to substitute a solvent easy to handle in supercritical drying. Examples of solvents to be substituted include not only methanol, ethanol, isopropyl alcohol and other alcohols which directly convert the solvent into a supercritical fluid, but also carbon dioxide, water and the like. Organic solvents such as acetone, isoamyl acetate, hexane and the like which are easily eluted with these supercritical fluids can also be substituted.

Supercritical drying can be carried out in an autoclave or other pressure vessel. For example, if the solvent is methanol the critical conditions of critical pressure 8.09 MPa or greater, critical temperature 239.4° C. or greater are set, and the pressure is gradually released while maintaining a constant temperature. If the solvent is carbon dioxide for example, the critical pressure is set to 7.38 MPa or greater and the critical temperature to 31.1° C. or greater, and the pressure is released from the supercritical state in the same way under constant temperature conditions to achieve a vapor state and dry the gel. If the solvent is water for example, the critical pressure is set to 22.04 MPa or greater and the critical temperature to 374.2° C. or greater to dry the gel. The time required for drying will be at least the time required for the solvent in the gel to be replaced once or more by the supercritical fluid.

Step 3

In Step 3, an oxide semiconductor/carbon composite porous body is obtained by heat treatment of the aforementioned composite dry gel.

The heat treatment temperature can be determined appropriately within the range of normally no less than 300° C. and no more than 1200° C. (particularly no less than 450° C. and less than 1000° C.) according to the type of oxide semiconductor (precursor), the desired material properties and the like.

For example 500° C. or more is used in the case of a titania precursor because conversion to anatase begins at about 500° C. or more. From the standpoint of efficient working times, a temperature of about 600 to 700° C. is desirable. The upper limit of the heating temperature can be at or below the heat-resistant temperature of the carbon material of network structure skeleton 1. For example a dry gel of carbon material shrinks slightly at about 600° C., but at 1200° or more graphitization begins to progress and shrinkage increases, so the baking temperature can be selected according to the degree of the shrinkage suppression effect. In particular it is desirable to bake at under 1000° C.

There are no limits on the atmosphere for heat treatment, which can be performed in atmosphere, an oxidizing atmosphere, a reducing atmosphere, an inert gas atmosphere, a vacuum or the like. In particular, when a high temperature is set it is preferably performed in an atmosphere of low oxygen concentration due to concerns of combustion and the like. In particular, an atmosphere with an oxygen concentration of 0 to 10% by volume is desirable. More preferably the atmosphere is an inert gas atmosphere or a vacuum. An inert gas atmosphere is the most desirable. Inert gasses which can be used include a variety of gasses such as nitrogen, argon, helium and the like.

(2) Method 2

Method 2 is a method for manufacturing a porous body which has a network structure skeleton, 1) the skeleton being composed of an inner part and a surface part, 2) the inner part being substantially made of carbon material, and 3) all or part of the surface part being an oxide semiconductor, the manufacturing method comprising:

(1) Step 1 of obtaining a dry gel having a network structure skeleton by drying a wet gel containing a carbon precursor and having a network structure skeleton;

(2) Step 2 of obtaining a composite precursor by coating the skeleton in the dry gel with an oxide semiconductor; and (3) Step 3 of obtaining an oxide semiconductor/carbon composite porous body by heat-treating the composite precursor.

Step 1

In Step 1, a dry gel having a network structure skeleton is obtained by drying a wet gel containing a carbon precursor and having a network structure skeleton.

A wet gel similar to the one shown in Method 1 can be used as the wet gel. Drying can also be accomplished in the same manner as in the drying of Step 2 in Method 1.

Step 2

In Step 2, a composite precursor is obtained by coating the skeleton in the dry gel with an oxide semiconductor.

The oxide semiconductor used may be one similar to the various ones mentioned in Method 1.

There are no particular limits on the method of coating with the oxide semiconductor, and generally two methods, a method of baking an oxide semiconductor precursor which has first been formed in a liquid phase and a method of imparting an oxide semiconductor in a vapor phase, can be used characteristically in the present invention. More particularly, 1) a method of first coating an oxide semiconductor precursor on the aforementioned skeleton and then heat treating it to produce an oxide semiconductor, and 2) a method of applying an oxide semiconductor in a vapor phase to the aforementioned skeleton can be used.

The method of 1) above can be performed according to Method 1. Heat treatment of the oxide semiconductor precursor may be performed together with the heat treatment of Step 3 in Method 2, or heat treatment can be carried out separately. In either case, the conditions for heat treatment can be as in Step 3 of Method 1.

For the method of 2) above, for example c) a method of applying heat treatment after forming an oxide semiconductor precursor in a vapor phase within a dry gel of a carbon precursor, d) a method of directly forming an oxide semiconductor in a vapor phase to coat a dry gel of a carbon precursor or the like can be adopted.

Known methods can be employed for the vapor phase method itself. For example, an ordinary method such as chemical vapor deposition (CVD), physical vapor deposition (PVD) or the like can be adopted wherein the oxide semiconductor or raw material thereof is vaporized or evaporated by heating or the like.

The method of c) above is a method of for example vaporizing the raw material of an oxide semiconductor precursor, introducing it into a dry gel, and reacting it within the dry gel to produce an oxide semiconductor precursor. For example, when forming titania as the oxide semiconductor, a raw material such as titanium tetrachloride, titanium methylphenoxide, titanium n-monoxide or the like is vaporized, and polymerized after it has filled the dry gel. This oxide semiconductor precursor can be then made to form an oxide semiconductor by subsequent heat treatment.

The method of d) above is a method of directly forming an oxide semiconductor on the skeleton of a dry gel by a vapor phase method using an oxide semiconductor raw material. The advantage of this method over the method of c) above is that it does not require heat treatment. When forming titania for example, titanium tetrachloride, metal titanium or the like can be used as the starting raw material, which is oxidized by heat, plasma, ions, light, a catalyst or the like. Alternatively, a coating can be formed on the dry gel by a method such as spattering, laser ablation or the like with titanium oxide as the target. Better control is achieved if a method using heating is used by preference to promote crystallization within the gel. In this case, one advantage of vapor phase deposition is that it allows treatment at lower temperatures than baking.

Step 3

In Step 3, an oxide semiconductor/carbon composite porous body is obtained by heat treating the aforementioned composite precursor.

The method of heat treatment may be the same as the method of Step 3 in Method 1. In particular the heat treatment atmosphere should preferably have an oxygen concentration of 0 to 10% by volume. An inert gas atmosphere or vacuum is preferred, with an inert gas atmosphere being especially preferred.

(3) Method 3

Method 3 is a method for manufacturing a porous body which has a network structure skeleton, 1) the skeleton being composed of an inner part and a surface part, 2) the inner part being substantially made of carbon material, and 3) all or part of the surface part being an oxide semiconductor, the manufacturing method comprising:

(1) Step 1 of obtaining a dry gel having a network structure skeleton by drying a wet gel containing a carbon precursor and having a network structure skeleton;

(2) Step 2 of obtaining a carbon porous body by carbonizing the dry gel, and (3) Step 3 of obtaining an oxide semiconductor/carbon composite porous body by coating the skeleton in the carbon porous body with an oxide semiconductor.

Step 1

In Step 1, a dry gel having a network structure skeleton is obtained by drying a wet gel containing a carbon precursor and having a network structure skeleton.

The wet gel containing a carbon precursor may be similar to the wet gel used in Method 1. The method of drying the wet gel may be according to the drying method of Step 2 in Method 1.

Step 2

In Step 2, a carbon porous body is obtained by carbonization of the aforementioned dry gel.

The method of carbonization may be similar to the heat treatment method of Step 3 in Method 1. In particular, the atmosphere for carbon treatment should preferably be an atmosphere with an oxygen concentration of 0 to 10% by volume. An inert gas atmosphere or vacuum is preferred, and of these an inert gas atmosphere is especially preferred.

Step 3

In Step 3, an oxide semiconductor/carbon composite porous body is obtained in the aforementioned porous body by coating an oxide semiconductor on the aforementioned skeleton.

The method of coating the oxide semiconductor on the carbon porous body may be similar to that of Step 2 in Method 2.

(4) Method 4

The present invention encompasses Method 4, wherein a further step of imparting a co-catalyst or dye is performed in Methods 1 through 3 above. The step of supporting a co-catalyst or dye in the present invention is explained.

The co-catalyst or dye used may be one used in the porous body of the present invention (one mentioned above).

There are no particular limits on the method of applying the co-catalyst or dye, which may be according to known methods. For example, 1) a method of supporting using a colloid, 2) a method of supporting a precursor of the co-catalyst or dye, and then reducing by means of a reducing agent such as hydrogen, or 3) a method of supporting a catalyst on a porous body by baking or the like of a precursor of the co-catalyst or dye may be used.

Any material which ultimately provides a co-catalyst or dye can be used as the aforementioned precursor. For example, a metal salt or the like can be used as the precursor of a co-catalyst. When using a precursor of a co-catalyst or dye, a process of catalyst formation or sensitizing dye formation can be applied after the precursor is supported. These methods can be selected appropriately according to the desired co-catalyst or dye, the type of materials used and the like.

The step of applying the catalyst or dye (or precursor thereof) can be performed at any stage in Methods 1 through 3. Examples include 1) a method of application during formation of a wet gel of carbon material or carbon precursor, 2) a method of application to the surface after formation of a wet gel of carbon material or carbon precursor, 3) a method of application during a step after formation of the oxide semiconductor precursor, 4) a method of application in a step after formation of the oxide semiconductor porous body or the like.

The supported amount of the co-catalyst or dye can be determined appropriately according to the properties of the porous body, the type of co-catalyst or dye used, the intended use and the like.

(5) Method 5

A step of removing part of the carbon material or precursor thereof which is the network structure skeleton can be included in Methods 1 through 4. By this step it is possible to reliable obtain a porous body having pores in part of the carbon material.

For the step of removing the carbon material or carbon precursor, a method is used of removing the carbon material or carbon precursor from the porous body, which is a composite of network structure skeleton 1 of carbon material or carbon precursor and an oxide semiconductor precursor or oxide semiconductor. There are no limits on the method of removal, which may be by a treatment such as evaporation, sublimation, elution or the like. Heat treatment is particularly suited to the present invention because removal of the carbon material and baking and crystallization of the oxide semiconductor material can be performed simultaneously. The method of heat treatment may be by heating in atmospheric gas containing oxygen (such as atmosphere) to a temperature of about 500° C. or more at which the carbon material combusts to become $CO_2$ gas. The upper limit of the heating temperature may be within the range of resistance temperature of the oxide semiconductor material of network structure skeleton 1. For example, heating titania over 800° C. results not in the anatase type having photocatalytic activity but in either the rutile type having low photocatalytic activity or a structure mixed with amorphous material, so the baking temperature for titania is preferably about 800° C. or less.

It is possible to remove all the carbon materials by further continuing heat treatment such as the above. The porous body obtained in this way is an oxide semiconductor porous body.

Favorable embodiments of the manufacturing method of the present invention are given below.

EMBODIMENT 5

Figure 5:
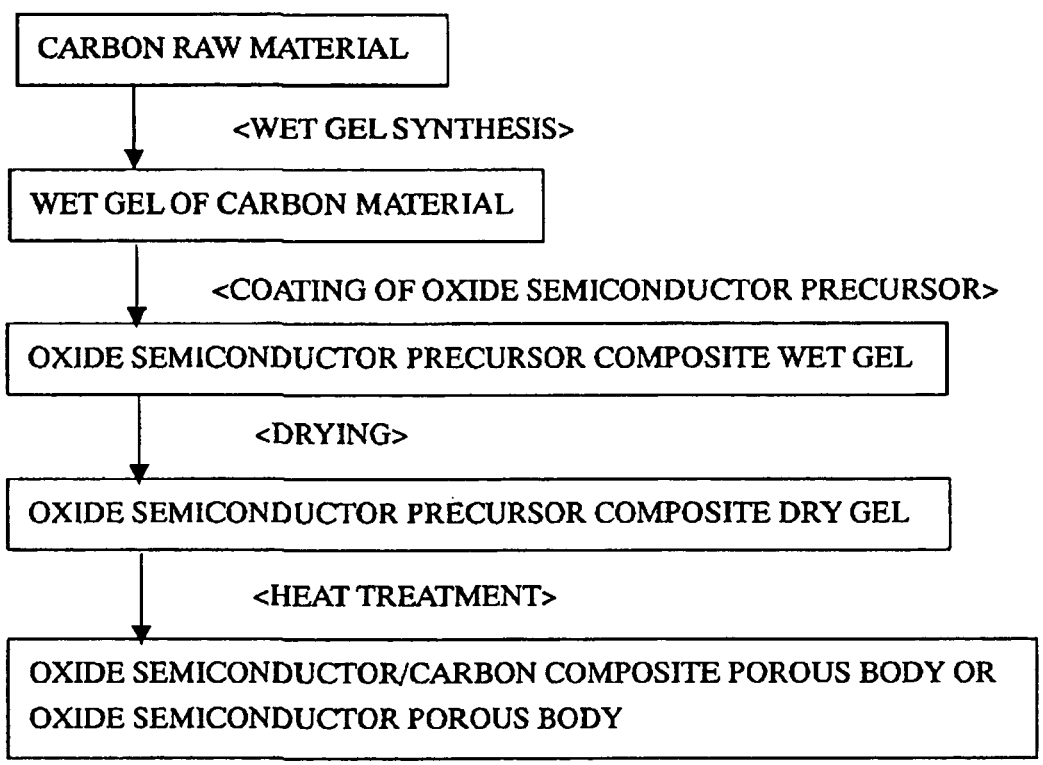
FIG. 5 is a process drawing showing an example of a method for manufacturing a porous body obtained in the present invention.

The first method (Method 1) for manufacturing an oxide semiconductor/carbon composite porous body or oxide semiconductor porous body in the present invention is composed of the basic steps shown in FIG. 5.

As basic steps, in this method a wet gel is first formed having network structure skeleton 1 of carbon material, then an oxide semiconductor precursor is formed on the wet gel, and the oxide semiconductor precursor is heat treated to produce a crystalline oxide semiconductor. That is, the method comprises a step of preparing a wet gel of carbon material from a carbon raw material, a step of coating the resulting wet gel of carbon material in a liquid phase with an oxide semiconductor precursor to obtain a composite wet gel of oxide semiconductor precursor, a step of drying the composite wet gel of oxide semiconductor precursor to obtain a composite dry gel, and a final step of heat-treating the dry gel to obtain a porous body.

By performing the heat treatment step in an inert gas atmosphere, an oxide semiconductor/carbon composite porous body can be obtained. In this manufacturing method, network structure skeleton 1 of the carbon material serves as a support to maintain the structure of the oxide semiconductor precursor during heat treatment, thus reducing shrinkage of the porous body of the precursor as it is heat treated. In this way it is possible to control the increase in density and limit the reduction in specific surface area as the precursor becomes a crystalline oxide semiconductor.

By performing the heat treatment step in a gas atmosphere containing oxygen it is also possible to remove the carbon material having network structure skeleton 1 to obtain an oxide semiconductor porous body. According to this manufacturing method, because network structure skeleton 1 is made of oxide semiconductor material, it is possible to form an oxide semiconductor porous body having a large specific surface area. Surface area can also be further increased because of the presence of hollows inside this network structure skeleton 1. In this way it is possible to obtain an oxide semiconductor porous body with low density and a large specific surface area. This porous body can be used effectively as a photocatalyst or photoelectrode material.

The above steps are basic steps and additional steps such as solvent replacement, catalyst formation, surface treatment and the like can be included when performing the various steps.

EMBODIMENT 6

Figure 6:
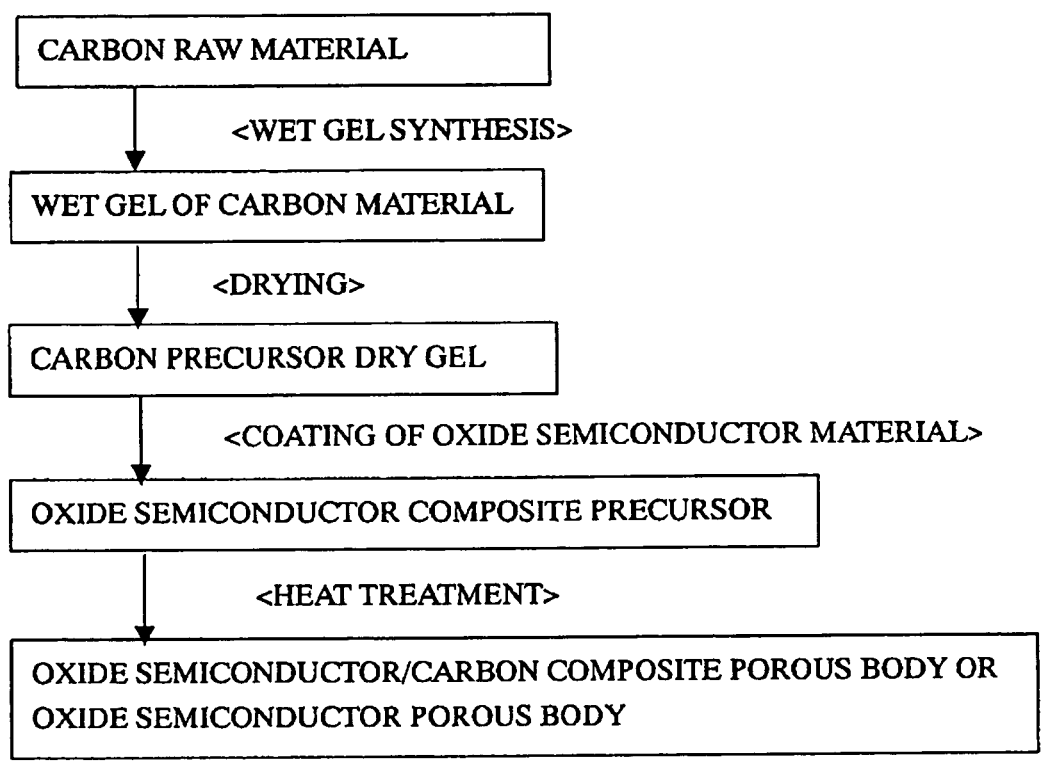
FIG. 6 is a process drawing showing another example of a method for manufacturing a porous body obtained in the present invention.

The second method (Method 2) for manufacturing an oxide semiconductor/carbon composite porous body or oxide semiconductor porous body in the present invention is composed of the basic steps shown in FIG. 6.

As basic steps, in this method an oxide semiconductor precursor is first formed in a dry gel obtained by formation of network structure skeleton 1 of carbon material, and then the oxide semiconductor precursor is heat treated to make a crystalline oxide semiconductor. That is, the method comprises a step of synthesizing a wet gel of carbon material from a raw carbon material, a step of drying the resulting wet gel of carbon material to obtain a dry gel of carbon precursor, a step of coating the dry gel with an oxide semiconductor material to form an oxide semiconductor composite precursor, and a step of heat treating the resulting oxide semiconductor composite precursor to obtain a porous body.

An oxide semiconductor/carbon composite porous body is obtained here by performing the heat treatment step in an inert gas atmosphere. In this manufacturing method, because network structure skeleton 1 of carbon material serves as a support to maintain the structure when the oxide semiconductor precursor is heat treated, it is possible to reduce shrinkage accompanying heat treatment of the porous body of precursor. In this way it is possible to control the increase in density and limit the reduction in specific surface area as the precursor becomes a crystalline oxide semiconductor.

By performing the heat treatment step in a gas atmosphere containing oxygen it is also possible to remove the carbon material having network structure skeleton 1 to obtain an oxide semiconductor porous body. In this manufacturing method, because network structure skeleton 1 is made of oxide semiconductor material, it is possible to form an oxide semiconductor porous body with a large specific surface area. Surface area can also be further increased because of the presence of hollows inside this network structure skeleton 1. In this way it is possible to obtain an oxide semiconductor porous body with low density and a large specific surface area. This porous body can be used effectively as a photocatalyst or photoelectrode material.

The above steps are basic steps and additional steps such as solvent replacement, catalyst formation, surface treatment and the like can be included when performing the various steps.

EMBODIMENT 7

Figure 7:
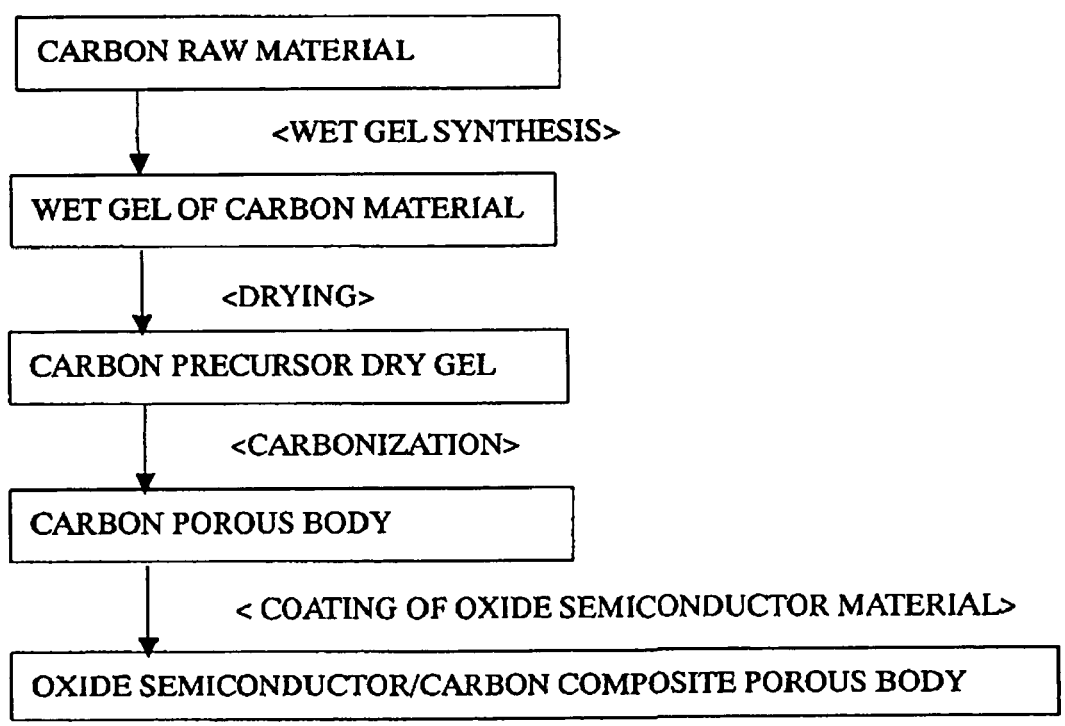
FIG. 7 is a process drawing showing an example of a method for manufacturing a porous body obtained in the present invention.

The third method (Method 3) for manufacturing an oxide semiconductor/carbon composite porous body or oxide semiconductor porous body in the present invention is composed of the basic steps shown in FIG. 7.

As basic steps, this method has a step of forming an oxide semiconductor in a vapor phase on a carbon porous body obtained by formation of network structure skeleton 1 of carbon material. That is, an oxide semiconductor/carbon composite porous body is obtained by a step of synthesizing a wet gel of a carbon material from a raw carbon material, a step of drying the resulting wet gel of raw carbon material to obtain a dry gel of carbon precursor, a step of carbonizing the dry gel to obtain a carbon porous body, and a step of forming an oxide semiconductor material in a vapor phase on the carbon porous body. As described above, methods which can be employed to form the oxide semiconductor in a vapor phase include i) a method of first forming an oxide semiconductor precursor in a vapor phase and then heat treating it in an inert gas atmosphere, ii) a method of directly forming the oxide semiconductor and the like.

In this manufacturing method, because network structure skeleton 1 of carbon material serves as a support to maintain the structure when the oxide semiconductor precursor is heat treated, it is possible to reduce shrinkage of the porous body of precursor as it is heat treated. In this way it is possible to control the increase in density and limit the reduction in specific surface area as the precursor becomes a crystalline oxide semiconductor. In particular, forming the oxide semiconductor directly in a vapor phase is advantageous because shrinkage and other distortions caused by heat treatment of the precursor are unlikely to occur.

It is also possible to remove part of the carbon material having network structure skeleton 1 from the resulting oxide semiconductor/carbon composite porous body. This removal step may be a heat treatment step or the like performed in a gas atmosphere containing oxygen. In this manufacturing method, forming network structure skeleton 1 from oxide semiconductor material allows the specific surface area to be increased over that of a porous body in which the carbon material is densely packed. In this way a porous body is obtained with lower density and a larger specific surface area. Such a porous body can be used effectively as a photocatalyst or photoelectrode material.

In this case, is also possible to remove all of the carbon material by further heat treatment or the like. In this way it is possible to obtain a porous body of oxide semiconductor. When manufacturing an oxide semiconductor porous body, because the carbon material (that is, the inner part) is entirely absent, it is possible to use a template material in place of carbon material. There are no limits on the template material as long as it can be removed while maintaining the surface part. For example, silica or the like can be used favorably as the template material. In this case, the silica or the like can be removed by etching.

The above steps are basic steps and additional steps such as solvent replacement, catalyst formation, surface treatment and the like can be included when performing the various steps.

EMBODIMENT 8

Figure 8:
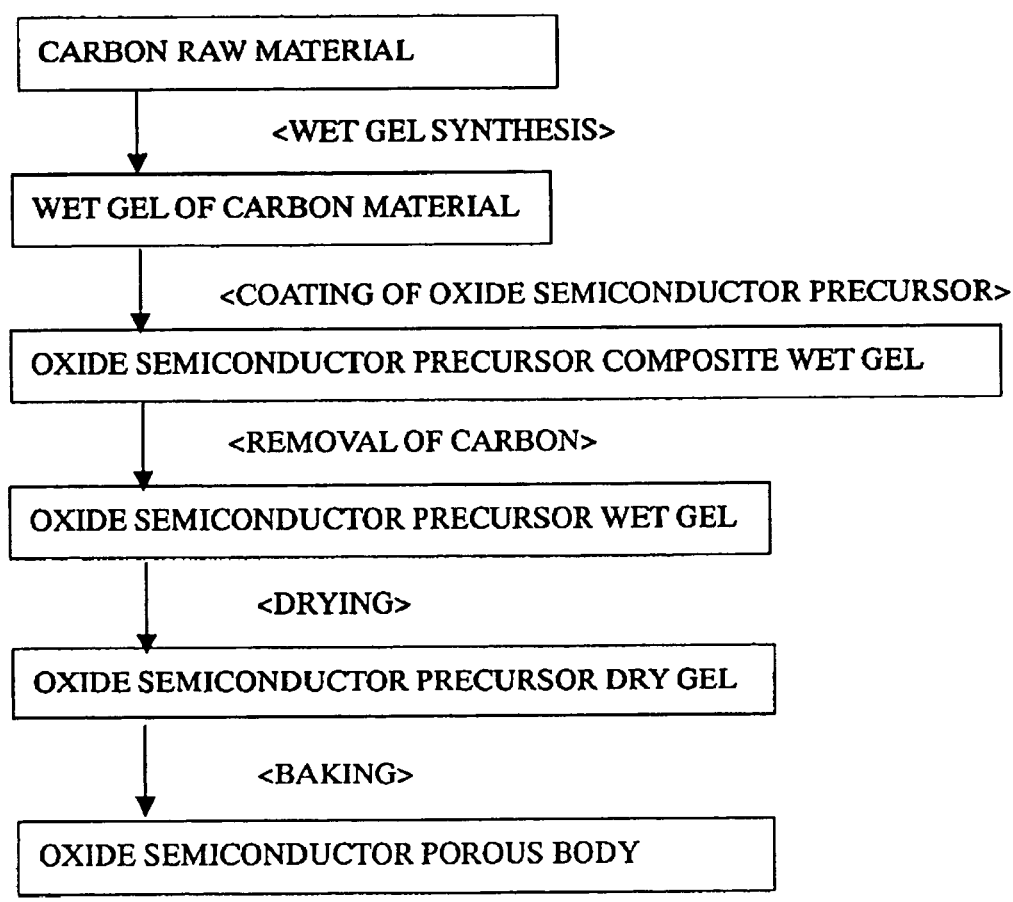
FIG. 8 is a process drawing showing another example of a method for manufacturing a porous body obtained in the present invention.

Another method for manufacturing an oxide semiconductor porous body according to the present invention is composed of the basic steps shown in FIG. 8.

As basic steps, in this method an oxide semiconductor. porous body is obtained by first forming an oxide semiconductor precursor on a wet gel of carbon material having network structure skeleton 1 and then removing the carbon material which is the core of network structure skeleton 1. That is, it comprises a step of synthesizing a wet gel of carbon material from raw carbon material, a step of obtaining a composite wet gel of oxide semiconductor precursor by coating the resulting wet gel of carbon material with an oxide semiconductor precursor in a liquid phase, a step of removing the carbon material from this composite wet gel to obtain an oxide semiconductor precursor wet gel, a step of drying the wet gel of oxide semiconductor precursor to obtain a dry gel, and heat-treating the dry gel to obtain a porous body.

In this manufacturing method, forming network structure skeleton 1 from an oxide semiconductor material allows the formation of an oxide semiconductor porous body with a large specific surface area. Moreover, surface area can be increased because of the presence of hollows inside network structure skeleton 1. In this way a porous body is obtained with low density and a large specific surface area. Such a porous body can be used effectively as a photocatalyst or photoelectrode material.

Because all of the carbon material is removed in this case a template material other than carbon material can be used. The materials given in Embodiment 7 can be used favorably as template materials. Also as in Embodiment 7, the porous body of the present invention can be manufactured by removing part of the carbon material in Embodiment 8.

ADVANTAGES OF THE INVENTION

According to the manufacturing method of the present invention, it is possible to manufacture a porous body of an oxide semiconductor system with low density and high specific surface area. That is, with the manufacturing method of the present invention an oxide semiconductor/carbon composite porous body can be provided composed of an oxide semiconductor material which produces efficient photocatalytic reaction.

In particular, because in the oxide semiconductor/carbon composite porous body of the present invention the core of network structure skeleton 1 has a carbon material with excellent conductivity characteristics, it is possible to produce photoelectrode reactions with high electrical efficiency. That is, because the carbon material contacts the oxide semiconductor, not only can electrons be directly exchanged between the two, but if the carbon material is connected to an electronic device by means of a lead wire or the like it is possible for electrons to be exchanged between the electronic device and the oxide semiconductor via the carbon material (and the aforementioned lead wire), thus allowing a photoelectric reaction to be achieved with high electrical efficiency.

INDUSTRIAL APPLICABILITY

Because the porous body of the present invention undergoes an efficient oxidation-reduction reaction when exposed to light, it can be used as a photocatalyst, photoelectrode or the like. More specifically, it can be used in such applications as solar cells (such as dye-sensitized solar cells), photoelectrochemical hydrogen production systems and the like.

EXAMPLES

The characteristics of the present invention are explained in more detail below using examples and comparative examples. However, the scope of the present invention is not limited by these examples.

Example 1

First, a wet gel was synthesized using a polyphenol polymer as the carbon precursor. An aqueous raw material solution with water as the solvent prepared from resorcinol (0.3 mol/L), formaldehyde and sodium carbonate to mole ratios of 1:2:0.01 was placed in a container and gelled to obtain a wet gel of solidified polyphenol.

Next, a composite wet gel of titania precursor was formed in the wet gel of polyphenol. For the titania precursor titanium tetraisopropoxide was diluted with ethanol anhydride, and triethanolamine and water were added to prepare an aqueous raw material solution in which the previous polyphenol wet gel was immersed so that the solution impregnated the skeleton of the gel. The titania precursor was left for two days each at room temperature and about 80° C. to coat the skeleton of the wet gel.

Next, the composite wet gel having titania precursor formed within the gel was dried. Drying was accomplished by supercritical drying after substitution of acetone for the solvent inside the wet gel, and the solvent within the gel was removed to obtain a composite dry gel of titania precursor. The conditions for supercritical drying were four hours at pressure 12 MPa and temperature 50° C. with carbon dioxide used as the drying medium, after which the pressure was gradually released to atmospheric pressure and the temperature lowered to obtain a dry gel. The size in this case was roughly the same before and after drying, with almost no shrinkage. The apparent density was about 220 kg/m$^3$, with a porosity of about 90%. The specific surface area was also shown to be high, about 800 m$^2$/g when measured by the BET method, a nitrogen adsorption method.

Finally, the composite dry gel of titania precursor was baked to obtain a titania/carbon composite porous body. The composite dry gel was left for 1 hour at 100° C., 1 hour at 200° C., 1 hour at 300° C., 1 hour at 400° C. and 1 hour at 500° C. in a nitrogen atmosphere and then the temperature was lowered to 400° C. for 1 hour, 300° C. for 1 hour, 200° C. for 1 hour and 100° C. for 1 hour and finally cooled to room temperature. In terms of dimensions the length of the dry gel after baking was about 90% of that before baking. The apparent density was about 300 kg/m$^3$, with a porosity of about 80%. The specific surface area was also shown to be high, about 450 m$^2$/g when measured by the BET method, a nitrogen adsorption method.

Comparative Example 1

A wet gel of a titania precursor alone was obtained under the conditions shown in Example 1 for comparison. Drying was performed under the same conditions as in Example 1 to obtain a dry gel of titania precursor. The length after baking was about 95% of that before baking. The apparent density was about 150 kg/m$^3$, with a porosity of about 90%. The specific surface area was also shown to be high, about 500 m$^2$/g when measured by BET, a nitrogen adsorption method.

This was also baked under the same conditions as in Example 1 to obtain a titania porous body. The length of the dry gel after baking was then about 70% of that before baking. After drying, the length of the dry gel was further shrank to about 65%. The apparent density was about 550 kg/m$^3$, with a porosity of about 40%. The specific surface area was about 150 m$^2$/g when measured by the BET method, a nitrogen adsorption method.

Thus, a wet gel of conventional titania precursor such as that of Comparative Example 1 has less shrinkage from drying but more shrinkage from baking. By contrast, it was possible to control shrinkage during baking while increasing specific surface area by means of a composite with a carbon wet gel as in Example 1.

Example 2

A composite dry gel of titania precursor was prepared under the same conditions as in Example 1. This composite dry gel was heat treated in atmosphere to evaporate the carbon skeleton and crystallize the titania to promote an anatase system, thus obtaining a titania porous body. The heat treatment conditions were 1 hour at 100° C., 1 hour at 200° C., 1 hour at 300° C., 1 hour at 400° C. and 1 hour at 500° C., after which the temperature was lowered to 400° C. for 1 hour, 300° C. for 1 hour, 200° C. for 1 hour and 100° C. for 1 hour and then cooled to room temperature. The length shrank to about 70% of that before heat treatment, but the apparent density was low, about 100 kg/m$^3$, and a high specific surface area of about 800 m$^2$/g was obtained. This titania porous body was confirmed by electron microscopy to have a hollow structure.

Example 3

First, a wet gel was synthesized using a polyphenol polymer as the carbon precursor under the conditions shown in Example 1. Next, the resulting polyphenol wet gel was washed with ethanol (solvent substitution), and supercritical dried with carbon dioxide to obtain a dry gel of polyphenol. The conditions for supercritical drying were the same as in Example 1.

Next, the dry gel of polyphenol was coated with a titania precursor. For the titania precursor, titanium tetraisopropoxide was diluted in ethanol anhydride, and triethanolamine, water and polyethylene glycol were added to prepare an aqueous raw material solution in which the previous polyphenol dry gel was immersed so that it impregnated the skeleton of the gel. After 2 days at room temperature the titania precursor had coated the skeleton of the dry gel.

Furthermore, the dry gel coated with the titania precursor was baked in a nitrogen atmosphere to obtain a titania/carbon composite porous body. The baking conditions were as in Example 1. The length of the gel after baking was about 85% of that before baking. The apparent density was about 300 kg/m$^3$, while the specific surface area was high, about 450 m$^2$/g.

Example 4

A composite gel with a coating of titania precursor was prepared under the same conditions as in Example 3. This composite gel was heat treated in atmosphere to evaporate the carbon skeleton and promote crystallization of the titania, to obtain a titania porous body. The baking conditions were as in Example 2. The length shrank to about 70% of that before heat treatment, the apparent density was low, about 100 kg/m$^3$, and the specific surface area was high, about 800 m$^2$/g. This titania porous body was shown by electron microscopy to have a hollow structure.

Example 5

First, a wet gel was synthesized using a polyimide polymer as the carbon precursor. An N-methylpyrolidone solution of 1% by weight polyamic acid synthesized from pyromellitic anhydride and 4,4'-oxydianiline was gelled in a container and fixed to obtain a polyamic acid wet gel.

Next, a carbon precursor polyimide dry gel was obtained by the following two methods from this polyamic acid wet gel.

In the first method, the polyamic acid wet gel was immersed in acetic acid anhydride and a pyridine solution and chemical imidation performed. This polyimide wet gel was dried to obtain polyimide dry gel A.

In the second method, the polyamic acid wet gel was dried to form a dry gel. This dry gel was thermally imidated at 300° C. in a nitrogen atmosphere to obtain polyimide dry gel B.

Carbonization of the resulting polyimide dry gels A and B was promoted at 600° C. in a nitrogen atmosphere to obtain carbonized carbon porous bodies. Carbon porous bodies were obtained in the same way from both dry gels A and B.

In addition, a network structure skeleton 1 of titania was formed on the carbon porous bodies. The carbon porous bodies were set in a vacuum film-forming device, a discharge plasma of titanium tetrachloride was formed by high-frequency waves at 13.56 MHz frequency, 200 W power, and the temperature was adjusted to 200° C. so that titania formed in the carbon porous bodies, resulting in titania/carbon composite porous bodies. The resulting titania was confirmed by X-ray analysis to have an anatase crystal structure. The apparent density of these titania/carbon composite porous bodies was about 220 kg/m$^3$ with little shrinkage and with a high specific surface area of about 600 m$^2$/g by the BET method.

Example 6

The titania/carbon composite porous body prepared in Example 5 was heat treated in atmosphere under the same conditions as in Example 2 to obtain a titania porous body. A low apparent density of about 100 kg/m$^3$ and a high specific surface area of 900 m$^2$/g were obtained. This titania porous body was also confirmed by electron microscopy to have a hollow structure, which is believed to be how the high specific surface area was achieved.

Example 7

Platinum catalysts were supported by the following methods on the titania/carbon composite porous body A prepared in Example 1 and the titania porous body B prepared in Example 2.

Platinum salt was supported by impregnating porous bodies A and B with a 3 mmol/L ethanol solution of platinic chloride. Sodium borohydride was then added at room temperature to achieve a catalyst of platinum particles. The amount of catalyst supported was about 0.2 mg/cm$^2$ and about 0.35 mg/cm$^2$, respectively, with more supported by porous body B which had a greater specific surface area.

The invention claimed is:

1. A method for manufacturing an oxide semiconductor/carbon porous body which has a network structure skeleton, 1) the skeleton being composed of an inner part and a surface part, 2) the inner part being substantially made of carbon material, and 3) all or part of the surface part being an oxide semiconductor, the manufacturing method comprising:
   (1) Step 1 of obtaining a composite wet gel by coating the skeleton in a carbon precursor-containing wet gel having a network structure skeleton with an oxide semiconductor precursor;
   (2) Step 2 of obtaining a composite dry gel by drying the composite wet gel; and
   (3) Step 3 of obtaining an oxide semiconductor/carbon composite porous body by heat-treating the composite dry gel.

2. The manufacturing method according to claim 1, wherein the heat treatment is performed in an atmosphere of oxygen concentration 0 to 10% by volume.

3. The manufacturing method according to claim 1, wherein the heat treatment is performed in an inert gas atmosphere.

4. The manufacturing method according to claim 1, further comprising a step of imparting a co-catalyst and/or dye.

5. The manufacturing method according to claim 1, wherein the carbon precursor comprises an organic polymer.

6. The manufacturing method according to claim 5, wherein the organic polymer is at least one of polyacrylonitrile, polyfurfuryl alcohol, polyimide, polyamide, polyamidimide, polyurethane, polyurea, polyphenol, polyaniline and polyparaphenylene.

7. A method for manufacturing a porous body which has a network structure skeleton, 1) the skeleton being composed of an inner part and a surface part, 2) the inner part being substantially made of carbon material, and 3) all or part of the surface part being an oxide semiconductor, the manufacturing method comprising:
   (1) Step 1 of obtaining a dry gel having a network structure skeleton by drying a wet gel containing a carbon precursor and having a network structure skeleton;
   (2) Step 2 of obtaining a composite precursor by coating the skeleton in the dry gel with an oxide semiconductor precursor; and
   (3) Step 3 of obtaining an oxide semiconductor/carbon composite porous body by heat-treating the composite precursor.

8. The manufacturing method according to claim 7, wherein the heat treatment is performed in an atmosphere of oxygen concentration 0 to 10% by volume.

9. The manufacturing method according to claim 7, wherein the heat treatment is performed in an inert gas atmosphere.

10. The manufacturing method according to claim 7, further comprising a step of imparting a co-catalyst and/or dye.

11. The manufacturing method according to claim 7, wherein the carbon precursor comprises an organic polymer.

12. The manufacturing method according to claim 11, wherein the organic polymer is at least one of polyacrylonitrile, polyfurfuryl alcohol, polyimide, polyamide, polyamidimide, polyurethane, polyurea, polyphenol, polyaniline and polyparaphenylene.

13. A method for manufacturing a porous body which has a network structure skeleton, 1) the skeleton being composed of an inner part and a surface part, 2) the inner part being substantially made of carbon material, and 3) all or part of the surface part being an oxide semiconductor, the manufacturing method comprising:
   (1) Step 1 of obtaining a dry gel having a network structure skeleton by drying a wet gel containing a carbon precursor and having a network structure skeleton;
   (2) Step 2 of obtaining a carbon porous body by carbonizing the dry gel, and
   (3) Step 3 of obtaining an oxide semiconductor/carbon composite porous body by coating the skeleton in the carbon porous body with an oxide semiconductor.

14. The manufacturing method according to claim 13, wherein the carbonization is performed in an atmosphere of oxygen concentration 0 to 10% by volume.

15. The manufacturing method according to claim 13, wherein the carbonization is performed in an inert gas atmosphere.

16. The manufacturing method according to claim 13, further comprising a step of imparting a co-catalyst and/or dye.

17. The manufacturing method according to claim 13, wherein the carbon precursor comprises an organic polymer.

18. The manufacturing method according to claim 17, wherein the organic polymer is at least one of polyacrylonitrile, polyfurfuryl alcohol, polyimide, polyamide, polyamidimide, polyurethane, polyurea, polyphenol, polyaniline and polyparaphenylene.

* * * * *